(12) United States Patent
Liu et al.

(10) Patent No.: US 12,204,170 B2
(45) Date of Patent: Jan. 21, 2025

(54) OPTICAL DRIVING MECHANISM

(71) Applicant: TDK TAIWAN CORP., Taoyuan (TW)

(72) Inventors: Shou-Jen Liu, Taoyuan (TW);
Man-Ting Lu, Taoyuan (TW);
Chen-Yu Yu, Taoyuan (TW);
Chen-Hsin Huang, Taoyuan (TW);
Yi-Chieh Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 624 days.

(21) Appl. No.: 17/475,824

(22) Filed: Sep. 15, 2021

(65) Prior Publication Data

US 2022/0082785 A1     Mar. 17, 2022

Related U.S. Application Data

(60) Provisional application No. 63/084,312, filed on Sep. 28, 2020, provisional application No. 63/078,641, filed on Sep. 15, 2020.

(51) Int. Cl.
| | |
|---|---|
| *G02B 7/08* | (2021.01) |
| *G02B 7/10* | (2021.01) |
| *G03B 5/02* | (2021.01) |
| *H04N 23/51* | (2023.01) |

(52) U.S. Cl.
CPC .............. *G02B 7/08* (2013.01); *G02B 7/10* (2013.01); *G03B 5/02* (2013.01); *H04N 23/51* (2023.01); *G03B 2205/0069* (2013.01)

(58) Field of Classification Search
None
See application file for complete search history.

(56) References Cited

U.S. PATENT DOCUMENTS

2013/0077184 A1*  3/2013  Osaka ............... H02K 41/0356
                                                         359/824

FOREIGN PATENT DOCUMENTS

CN        212255843 U       12/2020

OTHER PUBLICATIONS

Office Action mailed Feb. 9, 2022 in CN Application No. 202122236772.3, 2 pages.

* cited by examiner

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57) ABSTRACT

An optical driving mechanism is provided, including a movable portion, a fixed portion, a driving component and a first stopper component. The movable portion is configured to connect an optical element. The movable portion is movable relative to the fixed portion. The driving component is configured to drive the movable portion to move relative to the fixed portion. The first stopper component is configured to limit the range of movement of the movable portion relative to the fixed portion.

19 Claims, 8 Drawing Sheets

OPTICAL DRIVING MECHANISM

CROSS REFERENCE TO RELATED APPLICATIONS

This application claims the benefit of U.S. Provisional Application No. 63/078,641, filed Sep. 15, 2020, and U.S. Provisional Application No. 63/084,312, filed Sep. 28, 2020, the entirety of which are incorporated by reference herein.

BACKGROUND OF THE INVENTION

Field of the Invention

The present disclosure relates to an optical driving mechanism, and more particularly to an optical driving mechanism including stopper components.

Description of the Related Art

With the development of technology, many electronic devices (such as smartphones) nowadays are equipped with a camera and have the ability to record videos. The user can use the camera module installed in the electronic device to operate the electronic device to capture a variety of photos, bringing people rich visual enjoyment.

The present disclosure is directed to the problem that during the reliability test of the optical driving mechanism or due to impact (such as a fall), the components in the optical driving mechanism may generate fragments and debris due to the collision, which affects the imaging quality. This disclosure provides a solution to this problem.

BRIEF SUMMARY OF THE INVENTION

The present invention provides an optical driving mechanism, including a movable portion, a fixed portion, a driving component, and a first stopper component. The movable portion is configured to connect an optical element, and is movable relative to the fixed portion. The driving component is configured to drive the movable portion to move relative to the fixed portion. The first stopper component is configured to limit the moving range of the movable portion relative to the fixed portion.

According to some embodiments of the present disclosure, the first stopper component includes a first stopper element and a second stopper element. The first stopper element includes a first stopper surface, and a second stopper element includes a second stopper surface, which is configured to correspond to the first stopper element. When the movable portion moves to a first limiting position relative to the fixed portion, the first stopper element makes direct contact with the second stopper element.

According to some embodiments of the present disclosure, the roughness of the first stopper surface is different from the roughness of the second stopper surface.

According to some embodiments of the present disclosure, the roughness of the first stopper surface may be greater than the roughness of the second stopper surface. The roughness of the first stopper surface may be between 0.6 and 2, and the roughness of the second stopper surface may be between 0.05 and 0.5.

According to some embodiments of the present disclosure, the first stopper element has a plastic material, the second stopper element has a first metal material, and a second metal material is disposed on the second stopper surface. The second metal material is different from the first metal material.

According to some embodiments of the present disclosure, the first stopper element includes a first boundary and a second boundary. The first boundary and the second boundary are linear structures. When viewed along a first direction in which the first stopper element and the second stopper element are arranged, the first boundary and the second boundary are located on both sides of the first stopper element respectively, and the first boundary is parallel to the second boundary.

According to some embodiments of the present disclosure, the second stopper element includes a third boundary and a fourth boundary. The third boundary and the fourth boundary are linear structures. When viewed along the first direction, the third boundary and the fourth boundary are located on both sides of the second stopper element respectively, and the third boundary is parallel to the fourth boundary.

According to some embodiments of the present disclosure, the shortest distance between the first boundary and the second boundary is different from the shortest distance between the third boundary and the fourth boundary.

According to some embodiments of the present disclosure, the shortest distance between the first boundary and the second boundary may be greater than the shortest distance between the third boundary and the fourth boundary.

According to some embodiments of the present disclosure, the second stopper element further includes a first connecting surface adjacent to the second stopper surface. The first connecting surface and the second stopper surface are neither perpendicular nor parallel, and the first connecting surface and the second stopper surface intersect at the third boundary.

According to some embodiments of the present disclosure, the second stopper element further includes a back surface, a fifth boundary, and a sixth boundary. The first connecting surface and the back surface intersect at the fifth boundary. The sixth boundary is parallel to the third boundary and the fifth boundary.

According to some embodiments of the present disclosure, the first stopper element includes a first fixed surface and a second fixed surface, configured to fix a coil of the driving component. The first fixed surface and the second fixed surface face opposite directions. The first fixed surface and the first stopper surface intersect at a first boundary, and the second fixed surface and the first stopper surface intersect at a second boundary.

According to some embodiments of the present disclosure, the first stopper surface further includes one or more grooves. A first adhesive element is disposed in the groove. The coil is fixedly connected to the first stopper element via the first adhesive element. The surface of the first adhesive element is adhesive and may be configured to capture debris.

According to some embodiments of the present disclosure, in a direction of a main axis perpendicular to the first direction, the maximum length of the second fixed surface is less than the maximum length of the coil. The maximum length of the coil is greater than the maximum length of one of a plurality of magnetic elements of the driving component. The maximum width of the magnetic elements is less than the shortest distance between the first boundary and the second boundary.

According to some embodiments of the present disclosure, the optical driving mechanism further includes a second stopper component, configured to limit the movement of the movable portion relative to the fixed portion. The second stopper component includes a third stopper element and a fourth stopper element. The third stopper element includes a third stopper surface. The fourth stopper element includes a fourth stopper surface, and configured to correspond to the third stopper element. The third stopper element makes direct contact with the fourth stopper element when the movable portion moves to a second limiting position relative to the fixed portion. The second limiting position is different from the first limiting position. The third stopper element has a plastic material. The fourth stopper element has a third metal material. A fourth metal material is disposed on the fourth stopper surface. The fourth metal material is different from the third metal material. The roughness of the third stopper surface is greater than the roughness of the fourth stopper surface. The roughness of the third stopper surface is between 0.6 and 2, and the roughness of the fourth stopper surface is between 0.03 and 0.4. The roughness of the third stopper surface is the same as the roughness of the first stopper surface. The roughness of the fourth stopper surface is different from the roughness of the second stopper surface. The fourth stopper is electrically connected to an external circuit, and the fourth stopper element is electrically connected to the driving component.

According to some embodiments of the present disclosure, the fixed portion further includes a base. The body of the base has a plastic material. The fourth stopper element is fixedly disposed on the base. The fourth stopper element is at least partially embedded into and not exposed on the body. The body includes a base surface. A second adhesive element is disposed on the base surface. The base surface is parallel to the fourth stopper surface. A surface of the second adhesive element is adhesive, configured to capture debris. The base surface and the fourth stopper surface do not overlap when viewed along the first direction. The shortest distance between the base surface and the movable portion is greater than the shortest distance between the fourth stopper surface and the movable portion. The base further includes a plurality of protruding structures, which are arranged around the base surface.

According to some embodiments of the present disclosure, the driving component and the second adhesive element at least partially overlap when viewed along the direction of the main axis. The direction of the main axis is perpendicular to the first direction and the second direction. The second adhesive element is at least partially located between the coil and the magnetic elements when viewed along the direction of the main axis.

According to some embodiments of the present disclosure, a third stopper component is configured to limit the movement of the movable portion relative to the fixed portion. The third stopper component includes a fifth stopper element and a sixth stopper element. The fifth stopper element includes a fifth stopper surface. The sixth stopper element including a sixth stopper surface, and configured to correspond to the fifth stopper element. The fifth stopper element makes direct contact with the sixth stopper element when the movable portion moves to a third limiting position relative to the fixed portion. The third limiting position is different from the first limiting position and the second limiting position. The fifth stopper element has a plastic material. The sixth stopper element has a fifth metal material. A sixth metal material is disposed on the sixth stopper surface. The sixth metal material is different from the fifth metal material. The fifth metal material is the same as the third metal material, the sixth metal material is the same as the fourth metal material. The roughness of the fifth stopper surface is different from the roughness of the sixth stopper surface. The roughness of the fifth stopper surface is the same as the roughness of the first stopper surface. The roughness of the sixth stopper surface is the same as the roughness of the fourth stopper surface.

According to some embodiments of the present disclosure, a fourth stopper component is configured to limit the movement of the movable portion relative to the fixed portion. The fourth stopper component includes a seventh stopper element and an eighth stopper element. The seventh stopper element includes a seventh stopper surface. The eighth stopper element includes an eighth stopper surface and is configured to correspond to the seventh stopper element. The seventh stopper element makes direct contact with the eighth stopper element when the movable portion moves to a fourth limiting position relative to the fixed portion. The fourth limiting position is different from the first limiting position, the second limiting position and the third limiting position. The seventh stopper surface has a plastic material. The eighth stopper element has a seventh metal material, and an eighth metal material is disposed on the eighth stopper surface. The eighth metal material is different from the seventh metal material. The seventh metal material is different from the first metal material and the third metal material. The eighth metal material is different from the second metal material and the fourth metal material. The roughness of the seventh stopper surface is different from the roughness of the eighth stopper surface. The roughness of the seventh stopper surface is the same as the roughness of the first stopper surface. The roughness of the eighth stopper surface is different from the roughness of the second stopper surface and the fourth stopper surface.

According to some embodiments of the present disclosure, the permeability of the first metal material is greater than the permeability of the third metal material. The conductivity of the third metal material is greater than the conductivity of the first metal material. The conductivity of the third metal material is greater than the conductivity of the seventh metal material.

According to some embodiments of the present disclosure, the fixed portion includes a housing. The housing has a top wall and a side wall. The top wall and the side wall have a plate-like structure. The top wall is not parallel to the side wall.

BRIEF DESCRIPTION OF THE DRAWINGS

In order to make the above and other objectives, features, and advantages of the present disclosure more obvious and understandable, preferred embodiments are listed below in conjunction with the accompanying drawings, which are described in detail as follows.

DETAILED DESCRIPTION OF THE INVENTION

Figure 1:
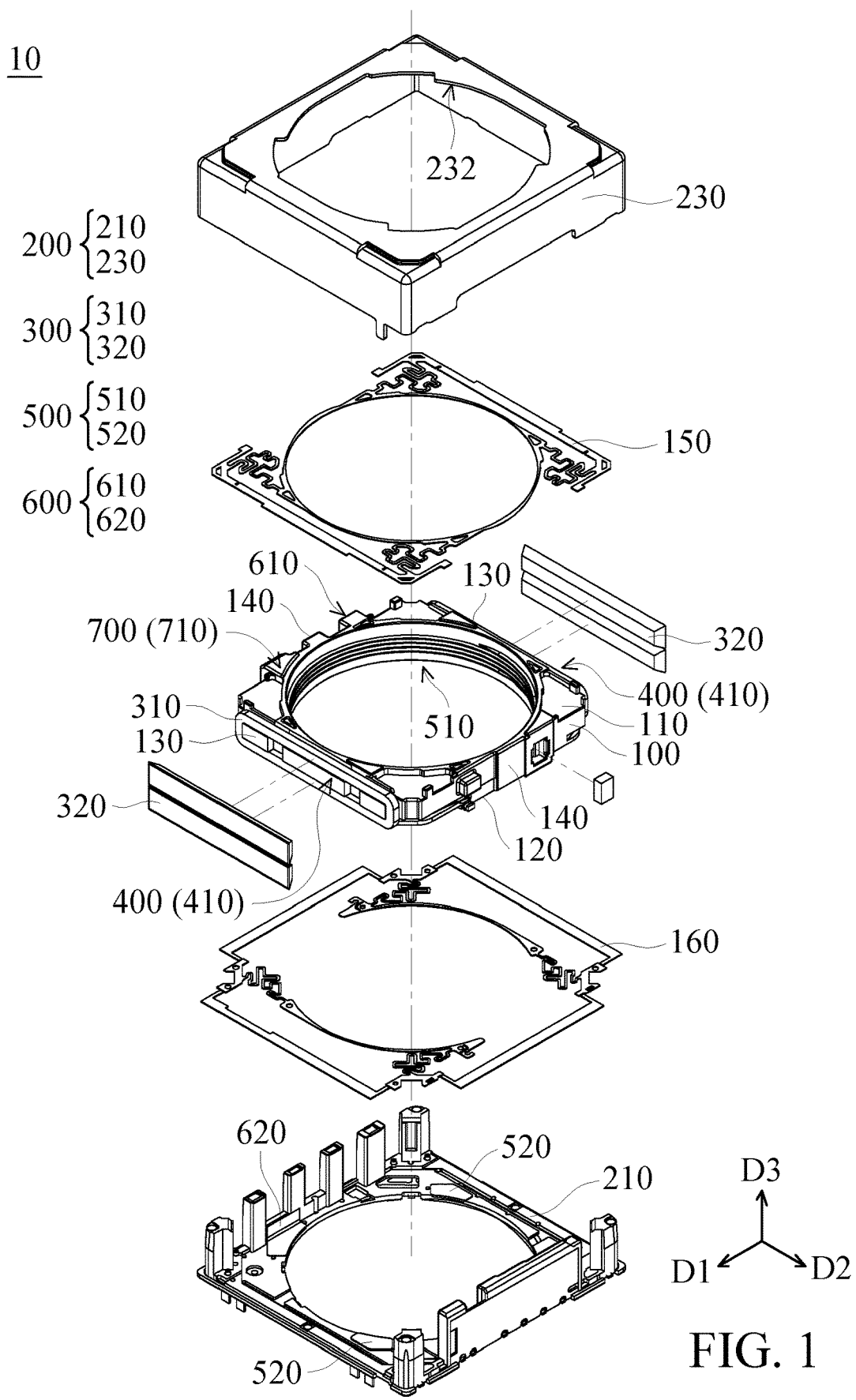
FIG. 1 is an exploded view of the optical driving mechanism according to some embodiments of the disclosure.

In order to make the purpose, features, and advantages of the present disclosure more obvious and understandable, the following embodiments are specially cited, and the accompanying drawings are used for detailed description. The exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In addition, relative terms such as "lower" or "bottom" and "upper" or "top" may be used in the embodiments to describe the relative relationship between one element and another element of the illustration. It should be understood that if the illustrated device is turned upside down, the elements described on the "lower" side will become the elements on the "upper" side.

The making and using of the embodiments of the optical driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure. Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Refer to FIG. 1, which is an exploded view of the optical driving mechanism 10 according to some embodiments of the present disclosure. The aforementioned optical driving mechanism 10 may be disposed in an electronic device such as a camera, a tablet or a mobile phone, and has a receiving portion or a holder and may be configured to carry an or a plurality of optical element (not shown).

As shown in FIG. 1, the optical driving mechanism 10 includes a movable portion 100, a fixed portion 200, a driving component 300, a first stopper component 400, a second stopper component 500, and a third stopper component 600, a fourth stopper component 700. The movable portion 100 is a holder, configured to connect an optical element (not shown), and may move relative to the fixed portion 200.

The fixed portion 200 includes a base 210 and a housing 230. The base 210 and the housing 230 of the fixed portion 200 are combined and fixed with each other to form an accommodating space, to protect the aforementioned components. The driving component 300 includes two magnetic elements 320 and two coils 310 configured to drive the movable portion 100 to move relative to the fixed portion 200.

The movable portion 100 includes an upper portion 110, a lower portion 120, two first side surfaces 130, and two second side surfaces 140. The upper portion 110 is the top surface of the movable portion 100 facing the housing 230. The lower portion 120 is the bottom surface of the movable portion 100 facing the base 210. The upper portion 110 of the movable portion 100 is parallel to the lower portion 120. The first side surfaces 130 are two opposite side surfaces of the movable portion 100, which are perpendicular to the upper portion 110 and the lower portion 120, and face the two magnetic elements 320 of the driving component 300 respectively. The two first side surfaces 130 are parallel to each other. Two opposite side surfaces of the movable portion 100 perpendicular to the first side surface 130 are the second side surfaces 140. The two second side surfaces 140 are parallel to each other.

When light from the outside enters the optical driving mechanism 10 that carries the optical element, the incident light passes through the optical element arranged in the optical driving mechanism 10 along the optical axis of the optical element from the light incident end (near the housing 230) to the light exit end (near the base 210). Then the light reaches a photosensitive element module (not shown) outside the optical driving mechanism 10 to obtain images.

The first stopper component 400 includes two first stopper elements 410. The two magnetic elements 320 may be used as second stopper elements to correspond to the first stopper element 410 to limit the displacement of the movable portion 100 relative to the fixed portion 200 in the first direction D1. The details of the first stopper component 400 will be shown in FIG. 3A. In addition, the number of first stopper elements 410 and second stopper elements is not limited to the present disclosure. In different embodiments, there may be more or fewer of the aforementioned stopper elements.

During the period when the optical driving mechanism 10 undergoes a reliability test or is subjected to an impact (such as, a fall), the movable portion 100 may move relative to the fixed portion 200 to a first limiting position where the first stopper element 410 makes direct contact with the magnetic element 320, the details of which will be described in relation to FIG. 3B.

The second stopper component 500 includes two third stopper elements 510 and two fourth stopper elements 520.

Figure 2A:
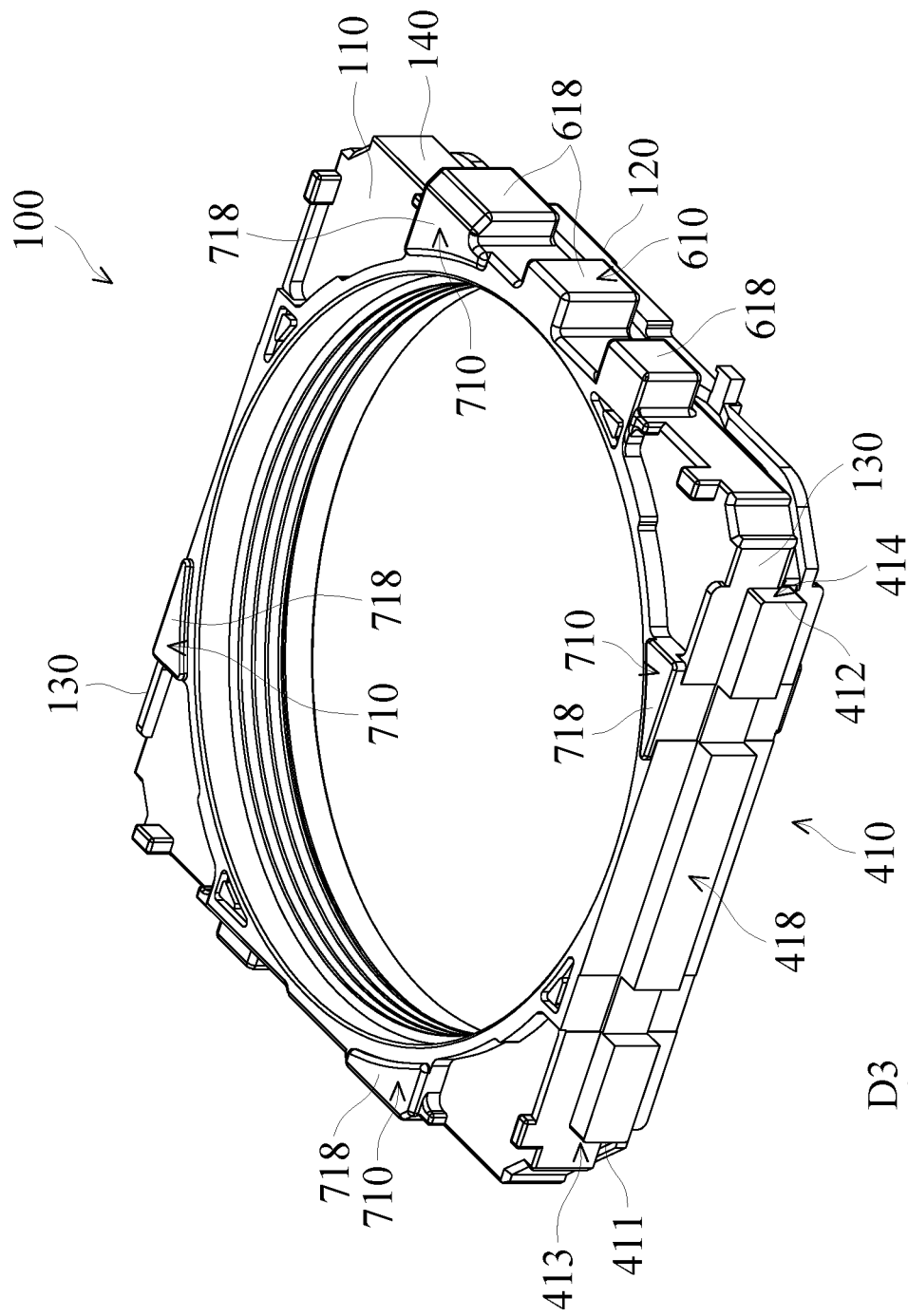
FIG. 2A is a perspective view of the movable portion of the optical driving mechanism according to some embodiments of the disclosure, showing the first stopper element, the fifth stopper element, and the seventh stopper element.
Figure 2B:
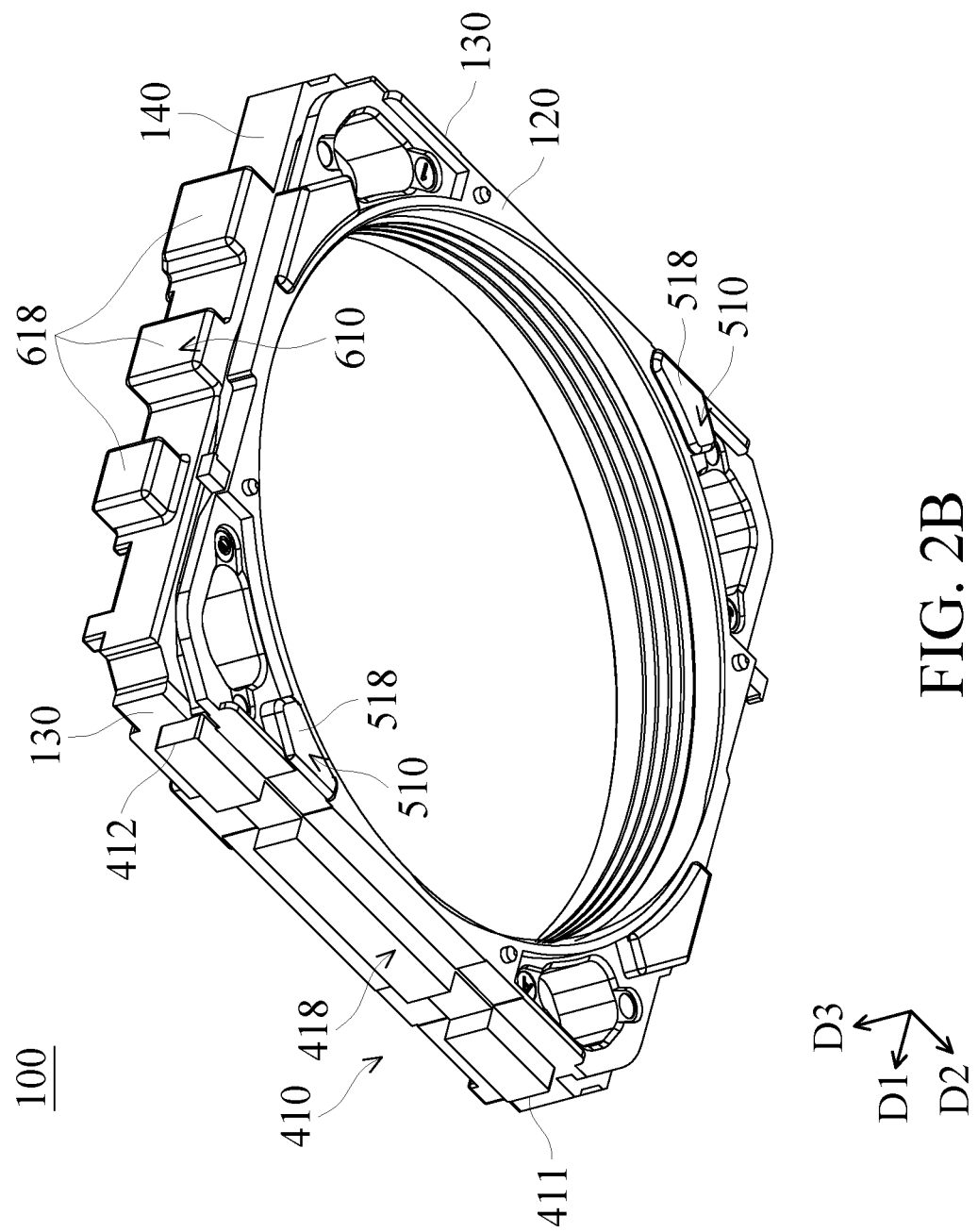
FIG. 2B is another perspective view of the movable portion of the optical driving mechanism according to some embodiments of the disclosure, showing the first stopper element, the third stopper element, and the fifth stopper element.

The third stopper element 510 is located on the lower portion 120 of the fixed portion 100, so the two third stopper elements 510 cannot be seen from the viewing angle in FIG. 1, and the details will be shown in FIG. 2B. The fourth stopper element 520 is located on the base 210, the details of which will be shown in FIG. 4.

The third stopper element 510 located on the movable portion 100 may correspond to the fourth stopper element 520 located on the base 210 to limit the displacement of the movable portion 100 in the direction of the main axis D3. In addition, the number of third stopper elements 510 and fourth stopper elements 520 is not limited to the present embodiment. In different embodiments there may be more or fewer of the aforementioned stopper elements.

During the period when the optical driving mechanism 10 undergoes a reliability test or is subjected to an impact (such as, a fall), the movable portion 100 may move relative to the fixed portion 200 to a second limiting position where the third stopper element 510 makes direct contact with the fourth stopper element 520. The second limiting position is different from the aforementioned first limiting position.

The third stopper component 600 includes a fifth stopper element 610 and a sixth stopper element 620. The fifth stopper element 610 is located on one of the second side surfaces 140 of the movable portion 100, and cannot be seen from the viewing angle in FIG. 1. The details of the fifth stopper element 610 will be shown in FIG. 2A. The sixth stopper element 620 is located on the base 210, the details of which will be shown in FIG. 4.

The fifth stopper element 610 positioned on the movable portion 100 corresponds to the sixth stopper element 620 positioned on the base 210, to limit the displacement of the movable portion 100 in the second direction D2. In addition, the number of fifth stopper elements 610 and sixth stopper elements 620 is not limited to the present embodiment. In different embodiments, there may be more or fewer of the aforementioned stopper elements.

During the period when the optical driving mechanism 10 undergoes a reliability test or is subjected to an impact (such as, a fall), the movable portion 100 may move relative to the fixed portion 200 to a third limiting position where the fifth stopper element 610 makes direct contact with the sixth stopper element 620. The third limiting position is different from the first limiting position and the second limiting position.

The fourth stopper component 700 includes four seventh stopper elements 710. The top wall 232 of the housing 230 of the fixed portion 200 may serve as the eighth stopper element 720 to correspond to the seventh stopper element 710, and thus limit the displacement of the movable portion 100 in the direction of the main axis D3. In addition, the number of seventh stopper elements 710 is not limited to the present embodiment. In different embodiments, there may be more or fewer of the aforementioned stopper elements. The details of the seventh stopper element 710 will be shown in FIG. 2A. The top wall 232 that serves as the eighth stopper element 720 cannot be seen from the viewing angle in FIG. 1, and its details will be shown in FIG. 5B.

During the period when the optical driving mechanism 10 undergoes a reliability test or is subjected to an impact (such as, a fall), the movable portion 100 may move relative to the fixed portion 200 to a fourth limiting position where the seventh stopper element 710 makes direct contact with the top wall 232. The fourth limiting position is different from the first limiting position, second limiting position, and third limiting position.

FIG. 2A is a perspective view showing the upper portion 110 of the movable portion 100 in FIG. 1. The seventh stopper element 710 located on the upper portion 110 of the movable portion 100, the first stopper element 410 located on the first side surface 130 of the movable portion 100, and the fifth stopper element 610 located on the second side surface 140 of the movable portion 100 can be seen. As shown in FIG. 2A, the first stopper element 410 includes a first stopper surface 418. The fifth stopper element 610 includes three fifth stopper surfaces 618. The seventh stopper element 710 includes a seventh stopper surface 718.

FIG. 2B is a perspective view of the lower portion 120 of the movable portion 100 shown from a bottom-up angle. The two third stopper elements 510 located on the lower portion 120 of the movable portion 100, the first stopper element 410 located on the first side surface 130 of the movable portion 100, and the fifth stopper element 610 located on the second side surface 140 of the movable portion 100 can be seen. As shown in FIG. 2B, the first stopper element 410 includes a first stopper surface 418, the details of which are detailed in FIG. 3A. The third stopper element 510 includes two third stopper surfaces 518. The fifth stopper element 610 includes three fifth stopper surfaces 618.

Referring to FIGS. 2A to 2B, according to the embodiment of the present disclosure, the movable portion 100 is made of plastic. In other words, the first stopper element 410, the third stopper element 510, the fifth stopper element 610, and the seventh stopper element 710 located on the movable portion 100 are all made of plastic. In addition, the roughness of the first stopper surface 418, the third stopper surface 518, the fifth stopper surface 618, and the seventh stopper surface 718 of the movable portion 100 are approximately the same and may be between 0.6 and 2.

Figure 3A:
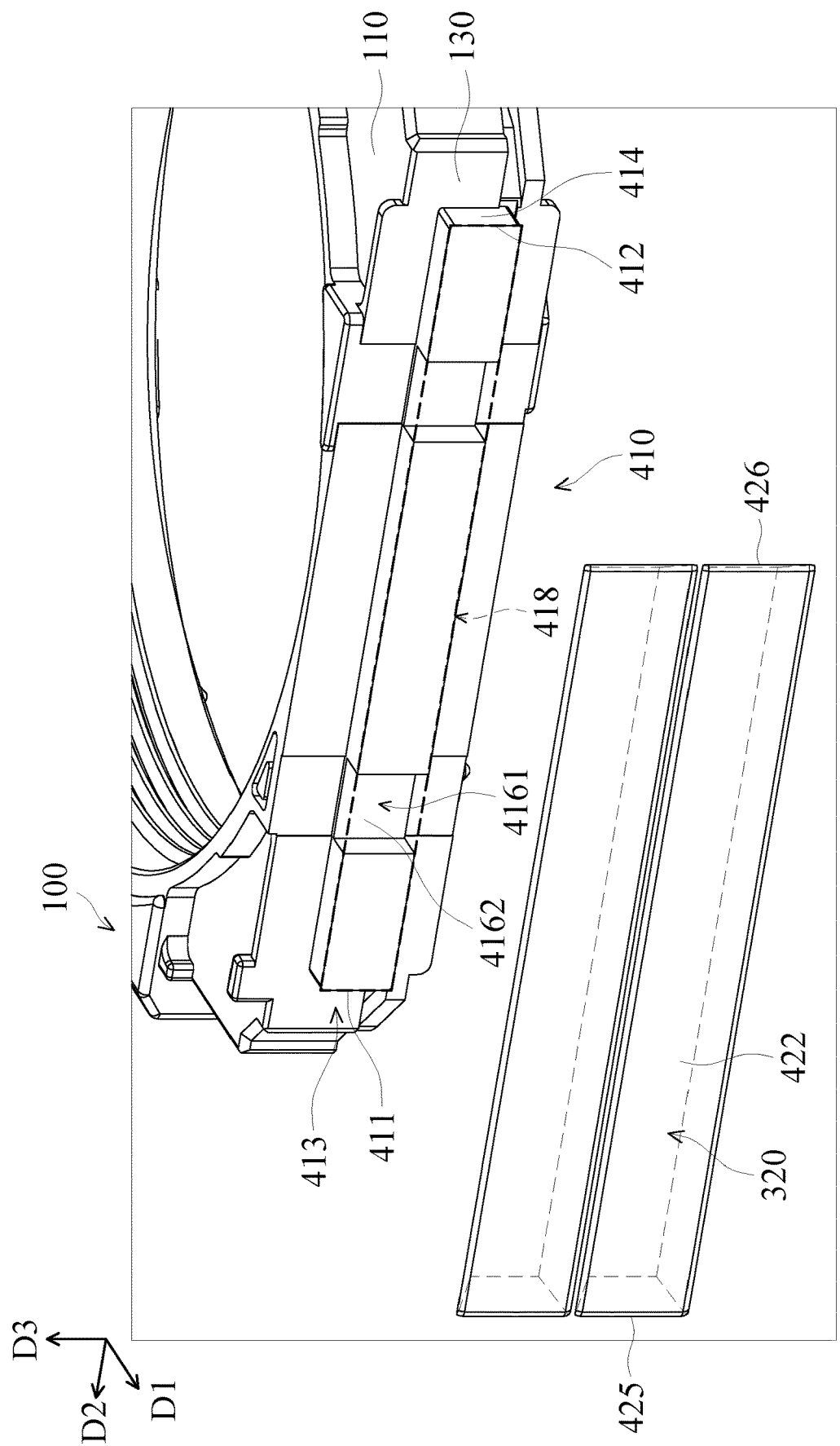
FIG. 3A is an enlarged perspective view of the movable portion and the magnetic element in FIG. 1, showing the first stopper element located on the first side surface of the movable portion and the magnetic element as the second stopper element.

FIG. 3A is an enlarged perspective view of the movable portion 100 and the magnetic element 320 in FIG. 1, showing the first stopper element 410 located on the first side surface 130 of the movable portion 100 and the magnetic element 320 that serves as the second stopper component. According to some embodiments of the present disclosure, the first stopper element 410 is a post or protrusion for fixing the coil 310 (FIG. 1).

As shown in FIG. 3A, both sides of the first stopper surface 418 of the first stopper element 410 may be defined by a first boundary 411 and a second boundary 412. The first boundary 411 and the second boundary 412 are linear structures. When viewed along a first direction D1 in which the first stopper element 410 and the magnetic element 320 are arranged, the first boundary 411 and the second boundary 412 are respectively located on both sides of the first stopper surface 418, and the first boundary 411 is parallel to the second boundary 412.

The first stopper element 410 further includes a first fixed surface 413 and a second fixed surface 414 configured to fix the coil 310 of the driving component 300 (FIG. 1). The first fixed surface 413 and the second fixed surface 414 are parallel to each other. The first fixed surface 413 and the second fixed surface 414 face opposite directions, wherein the first fixed surface 413 and the first stopper surface 418 intersect at the first boundary 411, and the second fixed surface 414 and the first stopper surface 418 intersect at the second boundary 412.

The first stopper surface 418 further includes one or more grooves 4161, in which a first adhesive element 4162 may be disposed in the groove 4161. The first adhesive element 4162 may be dustproof glue or gel. The coil 310 (FIG. 1) is fixedly connected to the first stopper element 410 via the first adhesive element 4162. The surface of the first adhesive element 4162 still has adhesiveness after curing. In addition to fixing the coil 310 to the first stopper element 410, the first adhesive element 4162 may also be configured to capture debris.

The debris described herein includes fragments generated by collision between the first stopper element 410 and the magnetic element 320 as the second stopper element, when the optical driving mechanism 10 undergoes a reliability test or is subjected to an impact (such as, a fall). By using the first adhesive element 4162 to adhere the debris, the imaging quality of the optical driving mechanism 10 may be improved.

As shown in FIG. 3A, the magnetic element 320 has a back surface 422 that is parallel to the first stopper surface 418 of the first stopper element 410. The two sides of the back surface 422 are respectively defined by a fifth boundary 425 and a sixth boundary 426. The magnetic element 320 also has a second stopper surface 428 facing the first stopper surface 418, and the second stopper surface 428 is parallel to the first stopper surface 418 and the back surface 422, which will be described in detail in FIG. 3B.

Figures 3B, 3C:
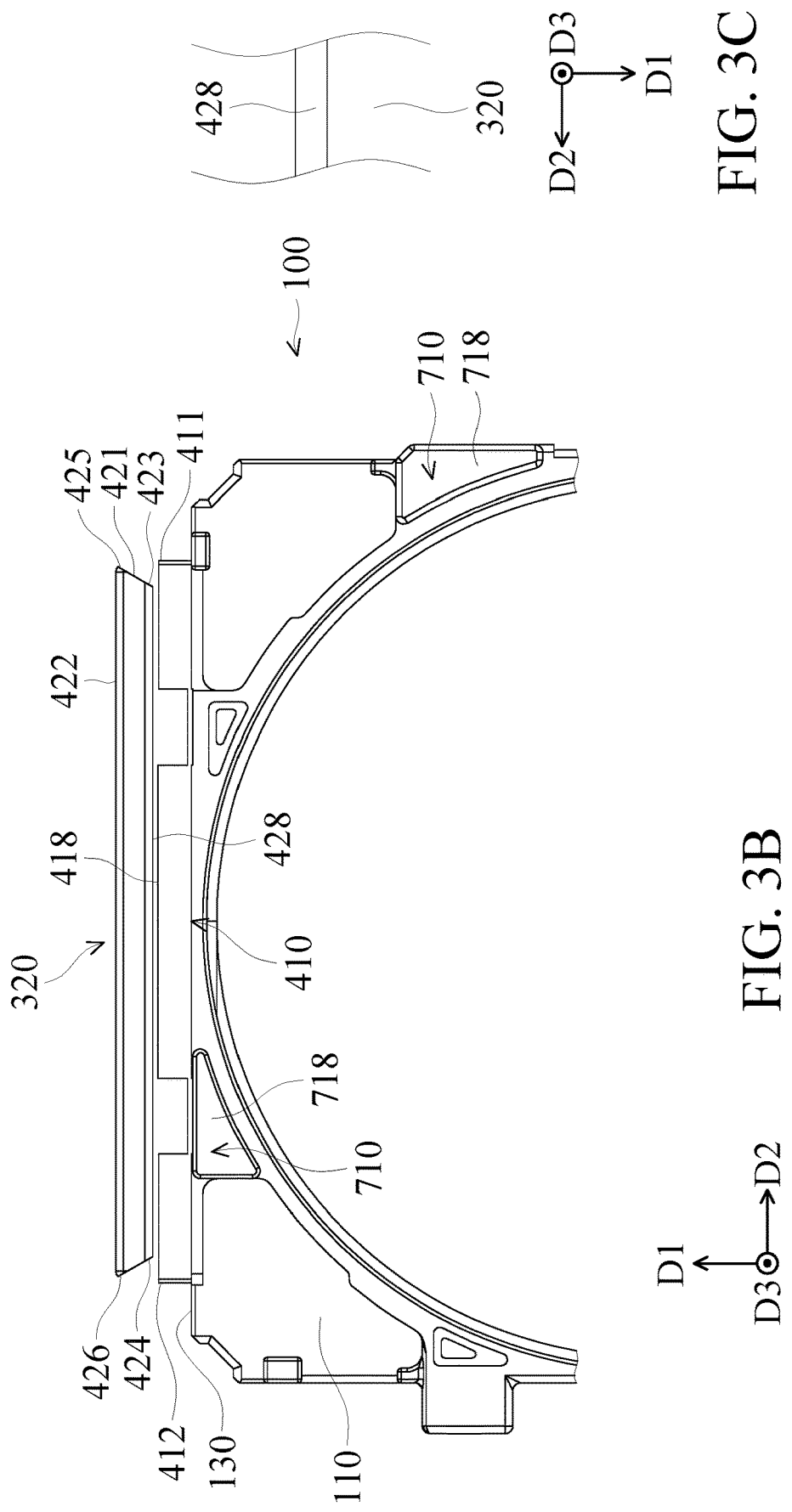
FIG. 3B is a top view of the movable portion and the magnetic element in FIG. 3A, showing the upper portion of the movable portion.
FIG. 3C shows a schematic cross-sectional view taken from the second stopper surface of the magnetic element in FIG. 3B.

FIG. 3B is an enlarged top view of the movable portion 100 and the magnetic element 320 in FIG. 3A. In FIG. 3B, the upper portion 110 of the movable portion 100 can be seen, the seventh stopper element 710 located on the upper portion 110 of the movable portion 100, the first stopper element 410 located on the first side surface 130 of the movable portion 100, and the magnetic element 320 that serves as the second stopper element can also be seen.

As shown in FIG. 3B, the magnetic element 320 has a trapezoidal structure. The top surface of the trapezoidal structure of the magnetic element 320 is the aforementioned second stopper surface 428 corresponding to the first stopper surface 418. The bottom surface of the trapezoidal structure of the magnetic element 320 is the back surface 422 parallel to the second stopper surface. The slope of the trapezoidal structure of the magnetic element 320 is a first connecting surface 421. The two sides of the second stopper surface 428 facing the first stopper surface 418 are defined by a third boundary 423 and a fourth boundary 424. The third boundary 423 and the fourth boundary 424 are linear structures. When viewed along the first direction D1, the third boundary 423 and the fourth boundary 424 are respectively located on both sides of the second stopper surface 428, and the third boundary 423 is parallel to the fourth boundary 424.

The first connecting surface 421 is adjacent to the second stopper surface 428. Since the first connecting surface 421 is a slope of a trapezoidal structure, the first connecting surface 421 and the second stopper surface 428 are neither perpendicular nor parallel, and the first connecting surface 421 and the second stopper surface 428 intersect at the third boundary 423. The first connecting surface 421 and the back surface 422 intersect at the fifth boundary 425. The sixth boundary 426 is parallel to the third boundary 423, the fourth boundary 424 and the fifth boundary 425.

The first stopper surface 418 of the first stopper element 410 may correspond to the second stopper surface 428 of the magnetic element 320. When the movable portion 100 moves to a first limiting position relative to the fixed portion 200 (FIG. 1), the first stopper surface 418 will directly contact the second stopper surface 428 of the magnetic element 320. The above-mentioned first limiting position may occur when the optical driving mechanism 10 undergoes a reliability test or is subjected to an impact (such as, a fall).

In addition, according to some embodiments of the present disclosure, the first stopper element 410 located on the movable portion 100 is made of plastic. The magnetic element 320 that serves as the second stopper element is made of the first metal material. The second stopper surface 428 is made of a second metal material. The second metal material described herein is different from the first metal material. For example, the first metal material may be iron used to manufacture the magnetic element 320, and the second metal material may be the nickel used to nickel plated the surface of the magnetic element 320 to form the second stopper surface 428. The schematic diagram of the second stopper surface 428 of the magnetic element 320 is shown in FIG. 3C, but the disclosure is not limited thereto.

According to some embodiments of the present disclosure, since the first stopper surface 418 and the second stopper surface 428 are made of different materials, the roughness of the first stopper surface 418 of the first stopper element 410 is different from the roughness of the second stopper surface 428 of the magnetic element 320 which serves as the second stopper element. For example, the roughness of the first stopper surface 418 may be between 0.6 and 2, and the roughness of the second stopper surface 428 may be between 0.05 and 0.5, but the present disclosure is not limited thereto.

Since the roughness of the magnetic element 320 which serves as the second stopper element is less than the roughness of the first stopper element 410, when the optical driving mechanism 10 undergoes a reliability test or is subjected to an impact (for example, a fall), fragments generated by the collision between the first stopper element 410 made of plastic and the magnetic element 320 serving as the second stopper element may be greatly reduced, thereby improving the imaging quality of the optical driving mechanism 10.

As shown in FIG. 3B, according to some embodiments of the present disclosure, the shortest distance between the first boundary 411 and the second boundary 412 of the first stopper surface 418 is different from the shortest distance between the third boundary 423 and the fourth boundary 424 of the second stopper surface 428. In detail, the shortest distance between the first boundary 411 and the second boundary 412 of the first stopper surface 418 is greater than the shortest distance between the third boundary 423 and the fourth boundary 424 of the second stopper surface 428.

Figure 3D:
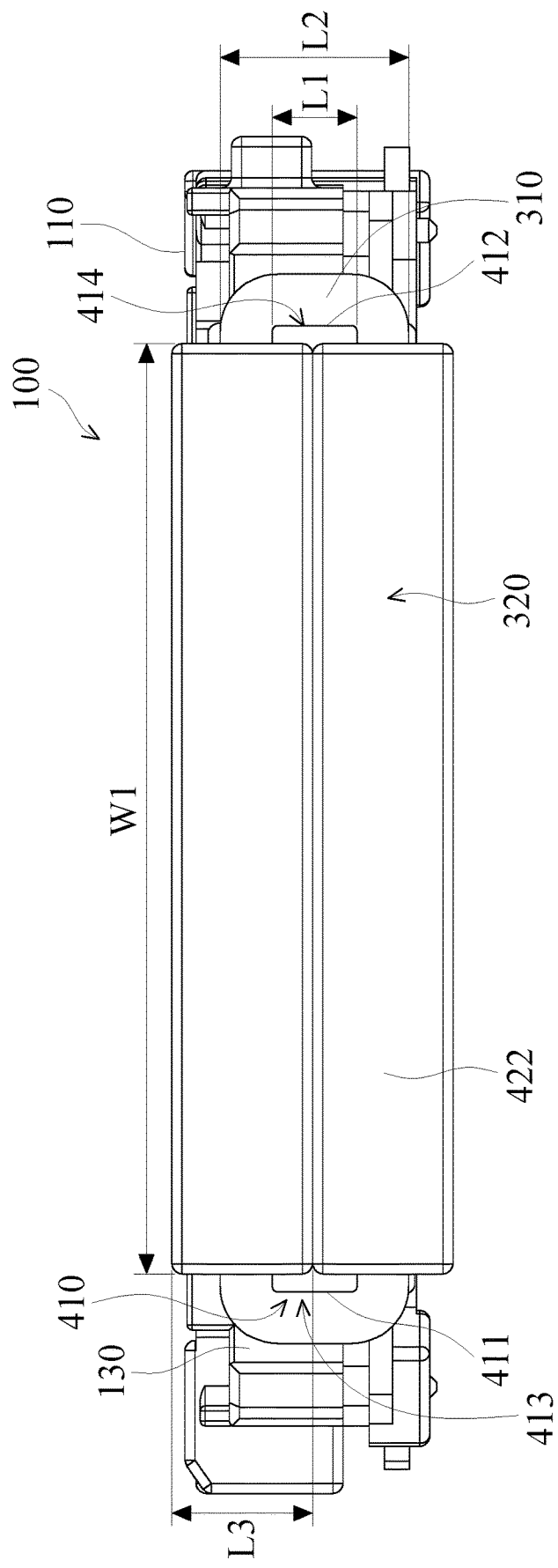
FIG. 3D is a side view of the movable portion, the coil, and the magnetic element of the optical driving mechanism according to some embodiments of the disclosure.

FIG. 3D is a partial side view of the optical driving mechanism 10, showing the movable portion 100, the coil 310, and the magnetic element 320. Part of the coil 310, the back surface 422 of the magnetic element 320, and the first boundary 411 and the second boundary 412 of the first stopper element 410 can be seen.

Referring to FIG. 3D, in the direction of the main axis D3, the maximum length L1 of the second fixed surface 414 of the first stopper element 410 is less than the maximum length L2 of the coil 310. The maximum length L2 of the coil 310 is greater than the maximum length L3 of one of the magnetic elements 320 of the driving component 300. The maximum width W1 of the magnetic element 320 is less than the shortest distance between the first boundary 411 and the second boundary 412. In other words, the width W1 of the magnetic element 320 does not exceed the left and right boundaries of the first stopper element 410.

In the prior art, when the optical driving mechanism 10 undergoes a reliability test or is subjected to an impact (such as, a fall), the first stopper element 410 where close to the first boundary 411 and the second boundary 412, often generates fragments due to the impact between the first stopper element 410 and the magnetic element 320.

On the contrary, in the present disclosure, the magnetic element 320 of the driving component 300 is designed as a trapezoidal structure, and the maximum width W1 of the magnetic element 320 is set to be less than the shortest distance between the first boundary 411 and the second boundary 412, so that when the optical driving mechanism 10 undergoes a reliability test or is subjected to an impact (such as, a fall), the fragments generated by the collision between the first stopper element 410 and the magnetic element 320 as the second stopper may be greatly reduced, thereby improving the imaging quality of the optical driving mechanism 10.

Figure 4:
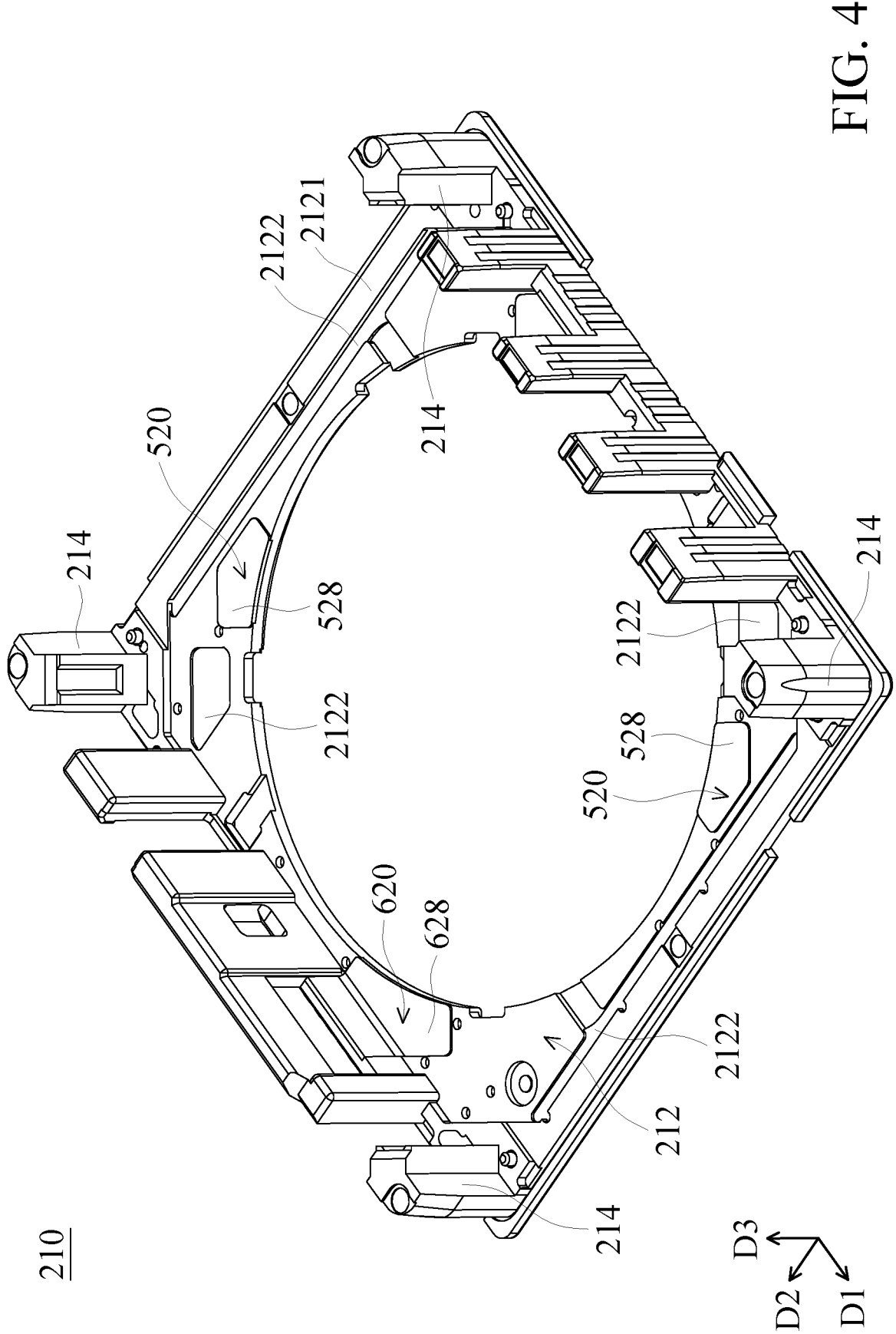
FIG. 4 is a perspective view of the base of the optical driving mechanism according to some embodiments of the disclosure.

FIG. 4 is a perspective view of the base 210 in FIG. 1. The base 210 includes a body 212 and a plurality of protruding structures 214. The body 212 includes a base surface 2121. In addition, the body 212 is made of plastic material. The protruding structure 214 is disposed around the base surface 2121.

In FIG. 4, the fourth stopper element 520 with the fourth stopper surface 528, and the sixth stopper element 620 with the sixth stopper surface 628 can also be seen. The fourth stopper element 520 is fixedly disposed on the base 210. The fourth stopper element 520 is at least partially embedded into and not exposed on the body 212. The fourth stopper element 520 is configured to correspond to the third stopper element 510 shown in FIG. 2B. The sixth stopper element 620 is configured to correspond to the fifth stopper element 610 in FIG. 2B.

When the movable portion 100 moves to a second limiting position relative to the fixed portion 200 (FIG. 1), the third stopper element 510 (FIG. 2B) makes direct contact with the fourth stopper element 520. The second limiting position may occur when the optical driving mechanism 10 undergoes a reliability test or is subjected to an impact (for example, a fall). The second limiting position is different from the aforementioned first limiting position.

When the movable portion 100 moves to the third limiting position relative to the fixed portion 200 (FIG. 1), the fifth stopper element 610 (FIG. 2B) makes direct contact with the sixth stopper element 620. The third limiting position is different from the first limiting position and the second limiting position. The third limiting position may occur when the optical driving mechanism 10 undergoes a reliability test or is subjected to an impact (for example, a fall).

According to some embodiments of the present disclosure, the base surface 2121 is parallel to the fourth stopper surface 528. When viewed along the first direction D1, the base surface 2121 and the fourth stopper surface 528 do not overlap. In addition, the shortest distance between the base surface 2121 and the movable portion 100 (FIG. 1) is greater than the shortest distance between the fourth stopper surface 528 and the movable portion 100. In this way, when the movable portion 100 (FIG. 2B) is in the second limiting position, the fixed portion 200 will contact the third stopper surface 518 (FIG. 2B) of the movable portion 100 with the fourth stopper surface 528, so that the base surface 2121 will not be damaged.

The fourth stopper element 520 may be made of a third metal material. The fourth stopper surface 528 is made of a fourth metal material, and the third metal material described herein is different from the fourth metal material. For example, the third metal material may be copper, and the fourth metal material may be nickel, but the present disclosure is not limited thereto.

In detail, the fourth stopper surface 528 is a nickel plated surface, so that the fourth stopper surface 528 is less likely to be oxidized and the surface roughness may be reduced.

The fourth stopper surface 528 may be located on the fourth stopper element 520 in a form similar to the second stopper surface 428 shown in FIG. 3C. The roughness of the third stopper surface 518 (FIG. 2B) corresponding to the fourth stopper surface 528 is greater than the roughness of the fourth stopper surface 528. In detail, the roughness of the third stopper surface 518 may be between 0.6 and 2, and the roughness of the fourth stopper surface 528 may be between 0.03 and 0.4.

Since the roughness of the fourth stopper surface 528 is less than the corresponding third stopper surface 518 (FIG. 2B), when the optical driving mechanism 10 undergoes a reliability test or is subjected to an impact (such as, a fall), the fragments generated by the collision between the third stopper element 510 and the fourth stopper element 520 may be greatly reduced, thereby improving the imaging quality of the optical driving mechanism 10.

The sixth stopper element 620 is made of a fifth metal material, and the sixth stopper surface 628 is made of a sixth metal material. In addition, the sixth metal material is different from the fifth metal material. For example, the fifth metal material may be copper, and the sixth metal material may be nickel, but the disclosure is not limited thereto.

In detail, the sixth stopper surface 628 is a nickel plated surface, so that the sixth stopper surface 628 is less likely to be oxidized and the surface roughness may be reduced. The sixth stopper surface 628 may be located on the sixth stopper element 620 in a form similar to the second stopper surface 428 shown in FIG. 3C. The roughness of the fifth stopper surface 618 (FIG. 2B) corresponding to the sixth stopper surface 628 is different from the roughness of the sixth stopper surface 628. Therefore, when the optical driving mechanism 10 undergoes a reliability test or is subjected to an impact (such as, a fall), the fragments generated by the collision between the fifth stopper element 610 and the sixth stopper element 620 may be greatly reduced, thereby improving the imaging quality of the optical driving mechanism 10.

In addition, the fourth stopper element 520 may be electrically connected to an external circuit (not shown), and the fourth stopper element 520 may be electrically connected to the driving component 300. In other words, the fourth stopper element 520 may have the function of conducting circuit, but the disclosure is not limited to this. For example, in other embodiments, the fourth stopper element 520 may also be used for the function of grounding.

In addition, the fifth metal material used to manufacture the sixth stopper element 620 may be the same as the third metal material used to manufacture the fourth stopper element 520. The sixth metal material used to manufacture the sixth stopper surface 628 may be the same as the fourth metal material used to manufacture the fourth stopper surface 528. For example, both the third metal material and the fifth metal material may be copper, and both the fourth metal material and the sixth metal material may be nickel. Therefore, the roughness of the fourth stopper surface 528 may be the same as the roughness of the sixth stopper surface 628.

A second adhesive element 2122 is disposed on the base surface 2121. The surface of the second adhesive element 2122 may be adhesive. For example, the second adhesive element 2122 may be dustproof glue or gel. The second adhesive element 2122 may also be configured to capture debris. The debris described herein includes fragments generated by collision between the stopper elements when the optical driving mechanism 10 undergoes a reliability test or is subjected to an impact (for example, a fall). By using the second adhesive element 2122 to adhere the debris, the imaging quality of the optical driving mechanism 10 may be improved.

When viewed along the direction of the main axis D3, the driving component 300 (FIG. 1) and the second adhesive element 2122 at least partially overlap. The direction of the main axis D3 is perpendicular to the first direction D1 and the second direction D2. When viewed along the direction of the main axis D3, the second adhesive element 2122 is at least partially located between the coil 310 (FIG. 1) and the magnetic element 320 (FIG. 1). With this configuration, the fragments generated by the collision between the first stopper component 400 (FIG. 1) adhere to the second adhesive element 2122, thereby improving the imaging quality of the optical driving mechanism 10.

Figure 5B:
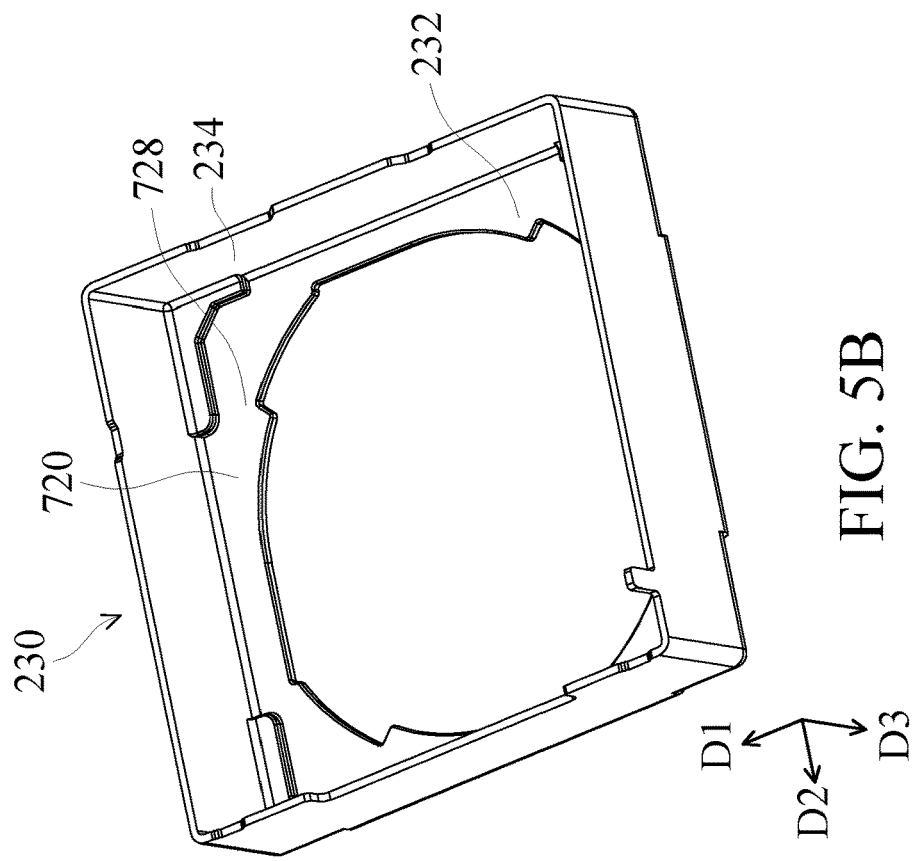
FIG. 5B is another perspective view of the housing of the optical driving mechanism according to some embodiments of the disclosure.
Figure 5A:
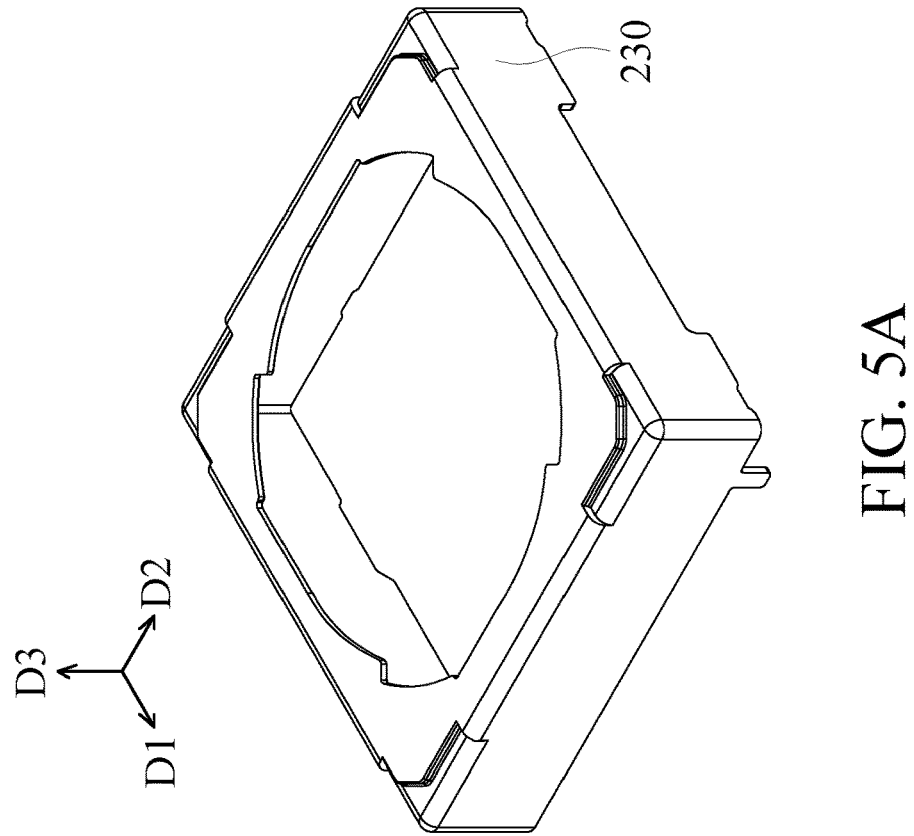
FIG. 5A is a perspective view of the housing of the optical driving mechanism according to some embodiments of the disclosure.

Referring to FIG. 5A and FIG. 5B, FIG. 5A shows a perspective view of the housing 230 in FIG. 1. FIG. 5B is a perspective view of the opposite side of the housing 230 in FIG. 5A. The housing 230 has a top wall 232 and a side wall 234. The top wall 232 and the side wall 234 have a plate-like structure, and the top wall 232 and the side wall 234 are not parallel.

The top wall 232 may serve as the eighth stopper element 720 corresponding to the seventh stopper element 710 on the movable portion 100 (FIG. 2A). When the movable portion 100 moves to a fourth limiting position relative to the fixed portion 200 (FIG. 1), the seventh stopper element 710 makes direct contact with the eighth stopper surface 728 on the top wall 232. The fourth limiting position is different from the aforementioned first limiting position, second limiting position, and third limiting position. The fourth limiting position may occur when the optical driving mechanism 10 undergoes a reliability test or is subjected to an impact (for example, a fall).

The housing 230 is made of a seventh metal material. The eighth stopper surface 728 is made of an eighth metal material. The eighth metal material is different from the seventh metal material. For example, the seventh metal material may be steel, and the eighth metal material may be nickel, but the disclosure is not limited thereto.

In detail, the eighth stopper surface 728 of the top wall 232 may be a nickel plated surface, so that the eighth stopper surface 728 is less likely to be oxidized, and the surface roughness may be reduced. The eighth stopper surface 728 may be located on the eighth stopper element 720 in a form similar to the second stopper surface 428 shown in FIG. 3C. Therefore, when the optical driving mechanism 10 undergoes a reliability test or is subjected to an impact (such as, a fall), the fragments generated by the collision between the seventh stopper element 710 (FIG. 2A) and the housing 230 may be greatly reduced, thereby improving the imaging quality of the optical driving mechanism 10.

Since different nickel alloys may be used for nickel plating on different stopper surfaces, the eighth metal material used to manufacture the eighth stopper surface 728 is different from the aforementioned second metal material used to manufacture the second stopper surface 428 (FIG. 3B), and the fourth metal material used to manufacture the fourth stopper surface 528 (FIG. 4). Therefore, the roughness of the eighth metal material may be different from the roughness of the second metal material and the fourth metal material.

The seventh metal material used to manufacture the housing 230 is different from the aforementioned first metal material of the magnetic element 320 that serves as the second stopper element, and the third metal material used to manufacture the fourth stopper element 520 provided on the base 210. For example, the first metal material may be iron, the third metal material may be copper, and the seventh metal material may be steel, but the present disclosure is not limited thereto.

In summary, the roughness of the seventh stopper surface 718 is different from the roughness of the eighth stopper surface 728. Since the seventh stopper surface 718 and the first stopper surface 418 are both located on the movable portion 100 which is made of plastic, the roughness of the seventh stopper surface 718 is the same as the roughness of the first stopper surface 418.

In addition, according to some embodiments of the present disclosure, since the first metal material is a material used to manufacture the magnetic element, the permeability of the first metal material may be greater than the permeability of the third metal material. According to some embodiments of the present disclosure, since the third metal material may have the function of conducting circuit, the conductivity of the third metal material may be greater than the conductivity of the first metal material and the seventh metal material.

Although the present invention discloses four components including the first stopper component 400, the second stopper component 500, the third stopper component 600, and the fourth stopper component 700, the present disclosure does not require the existence of all the four stopper components to be accomplished. Any combination of the above-mentioned four stopper components are included in the embodiments of the present disclosure.

Use of ordinal terms such as "first", "second", etc., in the claims and specification to modify an element does not by itself connote any priority, precedence, or order of one element over another or the temporal order in which acts of a method are performed, but are used merely as labels to distinguish one element having a certain name from another element having the same name to distinguish the elements.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical driving mechanism, comprising:
   a movable portion configured to connect an optical element;

a fixed portion, wherein the movable portion is movable relative to the fixed portion;
a driving component configured to drive the movable portion to move relative to the fixed portion; and
a first stopper component configured to limit a range of a movement of the movable portion relative to the fixed portion;
wherein the first stopper component comprises:
a first stopper element comprising a first stopper surface;
a second stopper element, comprising a second stopper surface, configured to correspond to the first stopper element;
wherein the first stopper element makes direct contact with the second stopper element when the movable portion moves to a first limiting position relative to the fixed portion;
wherein a roughness of the first stopper surface is different from a roughness of the second stopper surface.

2. The optical driving mechanism as claimed in claim 1, wherein the roughness of the first stopper surface is greater than the roughness of the second stopper surface, and the roughness of the first stopper surface is between 0.6 and 2, while the roughness of the second stopper surface is between 0.05 and 0.5.

3. The optical driving mechanism as claimed in claim 1, wherein the first stopper element has a plastic material, the second stopper element has a first metal material, a second metal material is disposed on the second stopper surface, and the second metal material is different from the first metal material.

4. The optical driving mechanism as claimed in claim 1, wherein the first stopper element comprises a first boundary and a second boundary, and the first boundary and the second boundary are linear structures, when viewed along a first direction in which a first stopper element and the second stopper element are arranged, the first boundary and the second boundary are respectively located on both sides of the first stopper element, and the first boundary is parallel to the second boundary.

5. The optical driving mechanism as claimed in claim 4, wherein the second stopper element comprises a third boundary and a fourth boundary, the third boundary and the fourth boundary are linear structures, wherein when viewed along the first direction, the third boundary and the fourth boundary are located on two sides of the second stopper element respectively, and the third boundary is parallel to the fourth boundary.

6. The optical driving mechanism as claimed in claim 5, wherein the shortest distance between the first boundary and the second boundary is different from the shortest distance between the third boundary and the fourth boundary.

7. The optical driving mechanism as claimed in claim 5, wherein the shortest distance between the first boundary and the second boundary is greater than the shortest distance between the third boundary and the fourth boundary.

8. The optical driving mechanism as claimed in claim 5, wherein the second stopper element further comprises a first connecting surface adjacent to the second stopper surface, the first connecting surface is neither perpendicular nor parallel to the second stopper surface, and the first connecting surface and the second stopper surface intersect at the third boundary.

9. The optical driving mechanism as claimed in claim 8, wherein the second stopper element further comprises:
a back surface;
a fifth boundary, wherein the first connecting surface and the back surface intersect at the fifth boundary; and
a sixth boundary parallel to the third boundary and the fifth boundary.

10. The optical driving mechanism as claimed in claim 8, wherein the first stopper element comprises a first fixed surface and a second fixed surface, configured to fix a coil of the driving component, the first fixed surface and the second fixed surface face opposite directions, wherein the first fixed surface and the first stopper surface intersect at the first boundary, and the second fixed surface and the first stopper surface intersect at the second boundary.

11. The optical driving mechanism as claimed in claim 10, wherein the first stopper surface further comprises one or more grooves, a first adhesive element is disposed in the groove, wherein the coil is fixedly connected to the first stopper element via the first adhesive element, and a surface of the first adhesive element is adhesive and is configured to capture debris.

12. The optical driving mechanism as claimed in claim 10, wherein in a direction of a main axis perpendicular to the first direction, a maximum length of the second fixed surface is less than a maximum length of the coil, the maximum length of the coil is greater than a maximum length of one of a plurality of magnetic elements of the driving component, and a maximum width of the magnetic elements is less than the shortest distance between the first boundary and the second boundary.

13. The optical driving mechanism as claimed in claim 12, further comprising a second stopper component configured to limit the movement of the movable portion relative to the fixed portion, wherein the second stopper component comprises:
a third stopper element comprising a third stopper surface; and
a fourth stopper element, comprising a fourth stopper surface, configured to correspond to the third stopper element;
wherein the third stopper element makes direct contact with the fourth stopper element when the movable portion moves to a second limiting position relative to the fixed portion, and the second limiting position is different from the first limiting position, the third stopper element has a plastic material, the fourth stopper element has a third metal material, a fourth metal material is disposed on the fourth stopper surface, and the fourth metal material is different from the third metal material, the roughness of the third stopper surface is greater than the roughness of the fourth stopper surface, a roughness of the third stopper surface is between 0.6 and 2, and a roughness of the fourth stopper surface is between 0.03 and 0.4, the roughness of the third stopper surface is the same as the roughness of the first stopper surface, the roughness of the fourth stopper surface is different from the roughness of the second stopper surface, the fourth stopper element is electrically connected to an external circuit, and the fourth stopper element is electrically connected to the driving component.

14. The optical driving mechanism as claimed in claim 13, wherein the fixed portion further comprises a base, a body of the base has a plastic material, and the fourth stopper element is fixedly disposed on the base, and the fourth stopper element is at least partially embedded into and not exposed on the body, the body comprises a base surface, a second adhesive element is disposed on the base surface, the base surface is parallel to the fourth stopper surface, a surface of the second adhesive element is adhesive, configured to capture debris, the base surface and the fourth stopper surface do not overlap when viewed along the first direction, the shortest distance between the base surface and the movable portion is greater than the shortest distance between the fourth stopper surface and the movable portion, and the base further comprises a plurality of protruding structures, which are arranged around the base surface.

15. The optical driving mechanism as claimed in claim 14, wherein the driving component and the second adhesive element at least partially overlap when viewed along the direction of the main axis, the second adhesive element is at least partially located between the coil and the magnetic elements when viewed along the direction of the main axis.

16. The optical driving mechanism as claimed in claim 13, further comprising a third stopper component configured to limit the movement of the movable portion relative to the fixed portion, and the third stopper component comprises:
a fifth stopper element comprising a fifth stopper surface;
a sixth stopper element, comprising a sixth stopper surface, configured to correspond to the fifth stopper element;
wherein the fifth stopper element makes direct contact with the sixth stopper element when the movable portion moves to a third limiting position relative to the fixed portion, and the third limiting position is different from the first limiting position and the second limiting position, the fifth stopper element has a plastic material, the sixth stopper element has a fifth metal material, and a sixth metal material is disposed on the sixth stopper surface, the sixth metal material is different from the fifth metal material, and the fifth metal material is the same as the third metal material, the sixth metal material is the same as the fourth metal material, and a roughness of the fifth stopper surface is different from a roughness of the sixth stopper surface, and the roughness of the fifth stopper surface is the same as the roughness of the first stopper surface, and the roughness of the sixth stopper surface is the same as the roughness of the fourth stopper surface.

17. The optical driving mechanism as claimed in claim 16, further comprising a fourth stopper component, configured to limit the movement of the movable portion relative to the fixed portion, and the fourth stopper component comprises:
a seventh stopper element comprising a seventh stopper surface;
an eighth stopper element, comprising an eighth stopper surface, configured to correspond to the seventh stopper element;
wherein the seventh stopper element makes direct contact with the eighth stopper element when the movable portion moves to a fourth limiting position relative to the fixed portion, and the fourth limiting position is different from the first limiting position, the second limiting position and the third limiting position, the seventh stopper surface has a plastic material, the eighth stopper element has a seventh metal material, and an eighth metal material is disposed on the eighth stopper surface, the eighth metal material is different from the seventh metal material, and the seventh metal material is different from the first metal material and the third metal material, and the eighth metal material is different from the second metal material and the fourth metal material, a roughness of the seventh stopper surface is different from a roughness of the eighth stopper surface, and the roughness of the seventh stopper surface is the same as the roughness of the first stopper surface, the roughness of the eighth stopper surface is different from the roughness of the second stopper surface and the fourth stopper surface.

18. The optical driving mechanism as claimed in claim 17, wherein a permeability of the first metal material is greater than a permeability of the third metal material, a conductivity of the third metal material is greater than a conductivity of the first metal material, and the conductivity of the third metal material is greater than a conductivity of the seventh metal material.

19. The optical driving mechanism as claimed in claim 1, wherein the fixed portion comprises a housing, the housing has a top wall and a side wall, the top wall and the side wall have a plate-like structure, and the top wall is not parallel to the side wall.

* * * * *